Sept. 14, 1954 J. S. BURGE ET AL 2,689,086

EJECTING AND COUNTING MECHANISM

Original Filed July 29, 1946 11 Sheets-Sheet 1

INVENTORS
JAME S. BURGE
FLOYD J. FOUST
WILLARD C. SHAW
HILTON J. MCKEE
WARREN M. RIDER

BY Spencer Hardman Fehr

THEIR ATTORNEYS

Sept. 14, 1954 J. S. BURGE ET AL 2,689,086

EJECTING AND COUNTING MECHANISM

Original Filed July 29, 1946 11 Sheets-Sheet 2

INVENTORS
JAMES S. BURGE - FLOYD J. FOUST
WILLARD C. SHAW - HILTON J. McKEE
WARREN M. RIDER

BY Spencer Hardman & Fehr
THEIR ATTORNEYS

Sept. 14, 1954 J. S. BURGE ET AL 2,689,086

EJECTING AND COUNTING MECHANISM

Original Filed July 29, 1946 11 Sheets-Sheet 3

INVENTORS
JAMES S. BURGE
FLOYD J. FOUST
WILLARD C. SHAW
HILTON J. McKEE
WARREN M. RIDER
BY
Spencer Hardman & Fehr
THEIR ATTORNEYS Sept. 14, 1954 J. S. BURGE ET AL 2,689,086

EJECTING AND COUNTING MECHANISM

Original Filed July 29, 1946 11 Sheets-Sheet 4

INVENTORS
JAMES S. BURGE
FLOYD J. FOUST
WILLARD C. SHAW
HILTON J. McKEE
WARREN M. RIDER
BY
Spencer Hardman & Fehr
THEIR ATTORNEYS INVENTORS
JAMES S. BURGE
FLOYD J. FOUST
WILLARD C. SHAW
HILTON J. McKEE
WARREN M. RIDER
BY
Spencer Hardman & Fehr
THEIR ATTORNEYS INVENTORS
JAMES S. BURGE
FLOYD J. FOUST
WILLARD C. SHAW
HILTON J. MCKEE
WARREN M. RIDER
BY
Spencer Hardman & Fehr
THEIR ATTORNEYS INVENTORS
JAMES S. BURGE
FLOYD J. FOUST
WILLARD C. SHAW
HILTON J. MCKEE
WARREN M. RIDER
BY
Spencer Hardman & Fehr
THEIR ATTORNEYS Sept. 14, 1954 J. S. BURGE ET AL 2,689,086

EJECTING AND COUNTING MECHANISM

Original Filed July 29, 1946 11 Sheets-Sheet 8

INVENTORS
JAMES S. BURGE
FLOYD J. FOUST
WILLARD C. SHAW
HILTON J. McKEE
WARREN M. RIDER
BY
Spencer Hardman & Fehr
THEIR ATTORNEYS

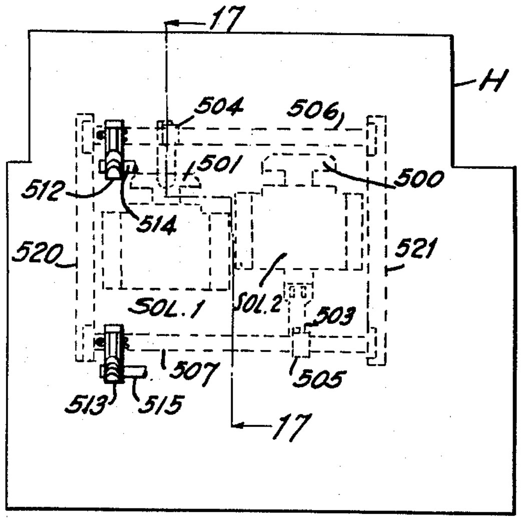
Fig. 16
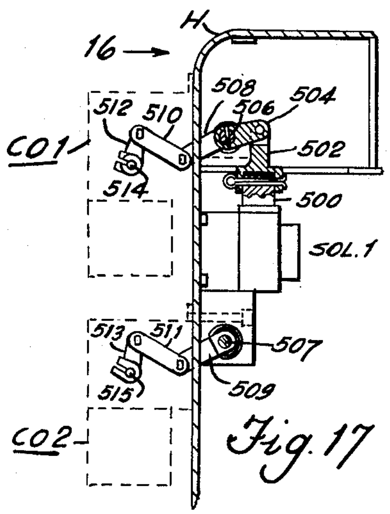
Fig. 17
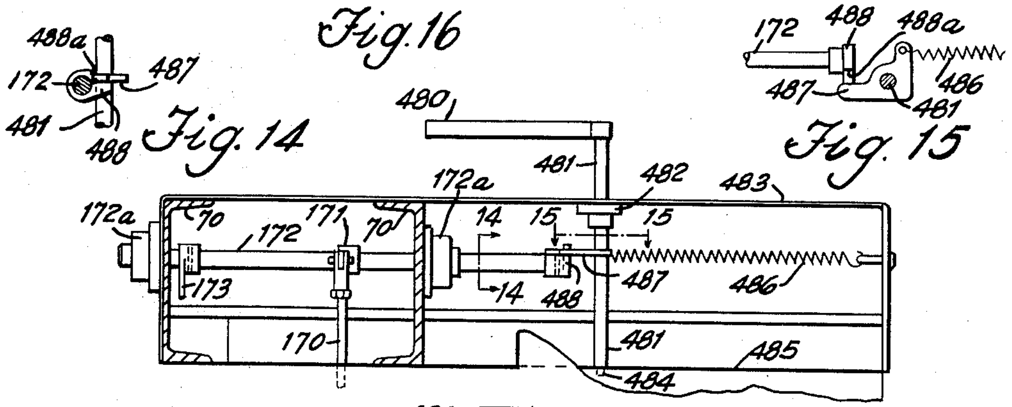
Fig. 14
Fig. 15
Fig. 13
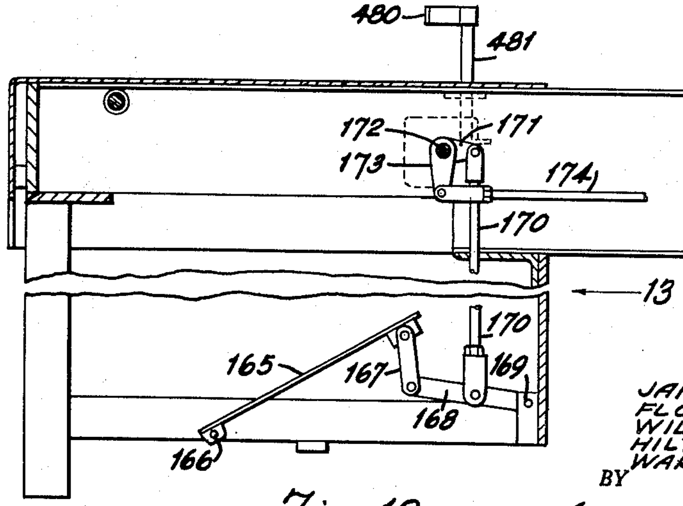
Fig. 12
INVENTORS
JAMES S. BURGE
FLOYD J. FOUST
WILLARD C. SHAW
HILTON J. McKEE
WARREN M. RIDER
BY
Spencer Hardman & Fehr
THEIR ATTORNEYS INVENTORS
JAMES S. BURGE - FLOYD J. FOUST
WILLARD C. SHAW - HILTON J. McKEE
WARREN M. RIDER
BY Spencer Hardman & Fehr
THEIR ATTORNEYS INVENTORS
JAMES S. BURGE
FLOYD J. FOUST
WILLARD C. SHAW
HILTON J. McKEE
WARREN M. RIDER
BY
Spencer Hardman Fehr
THEIR ATTORNEYS Patented Sept. 14, 1954 2,689,086

UNITED STATES PATENT OFFICE 2,689,086

EJECTING AND COUNTING MECHANISM

James S. Burge, Floyd J. Foust, Willard C. Shaw, and Warren M. Rider, Anderson, and Hilton J. McKee, Middletown, Ind., assignors to General Motors Corporation, Detroit, Mich., a corporation of Delaware Original application July 29, 1946, Serial No. 686,964. Divided and this application May 24, 1950, Serial No. 163,963

5 Claims. (Cl. 235—98)

This application is a division of application Serial No. 686,964 filed July 29, 1946, now Patent No. 2,596,396 which discloses apparatus comprising a conveyor having work holders which receive an electrical condenser from which there extends an insulated wire having a bared end. The conveyor moves intermittently to locate each condenser successively at a station where a terminal clip is attached to the wire, at a station where the bared portion of the wire is attached to the clip and at a station where the condenser is ejected and is counted as it gravitates upon a chute which directs it into a box.

An object of the invention claimed in this application is to allow only a predetermined number of condensers to pass into a box. Two counters are provided each under control by a device sensing ejection of a condenser, one being selected to start counting ejected condensers when the other has counted to a certain number. When a counter has counted-out, a door moves to block descent of condensers from the chute into a full box so that the machine attendant can replace the full box by an empty box and then move the door to non-blocking position whereupon the condensers accumulated in the chute gravitate to the empty box.

Further objects and advantages of the present invention will be apparent from the following description, reference being had to the accompanying drawings, wherein a preferred embodiment of the present invention is clearly shown.

In the drawings:

Fig. 12 is a sectional view on line 12—12 of Fig. 1.

Fig. 13 is a sectional view on line 13—13 of Fig. 1.

Figs. 14 and 15 are sectional views on lines 14—14 and 15—15, respectively, of Fig. 13.

Fig. 16 is a view in the direction of arrow 16 of Fig. 17.

Fig. 17 is a sectional view on line 17—17 of Fig. 16.

Figure 18:
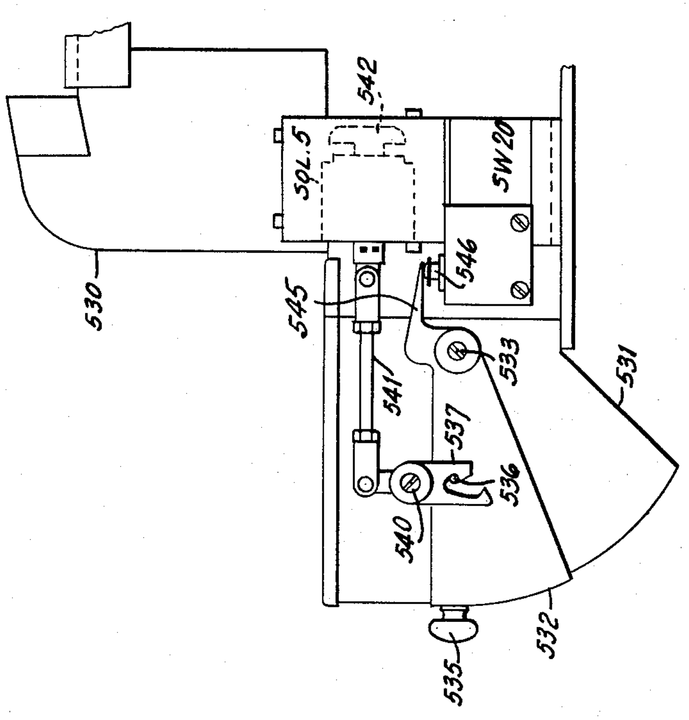
Figure 19:
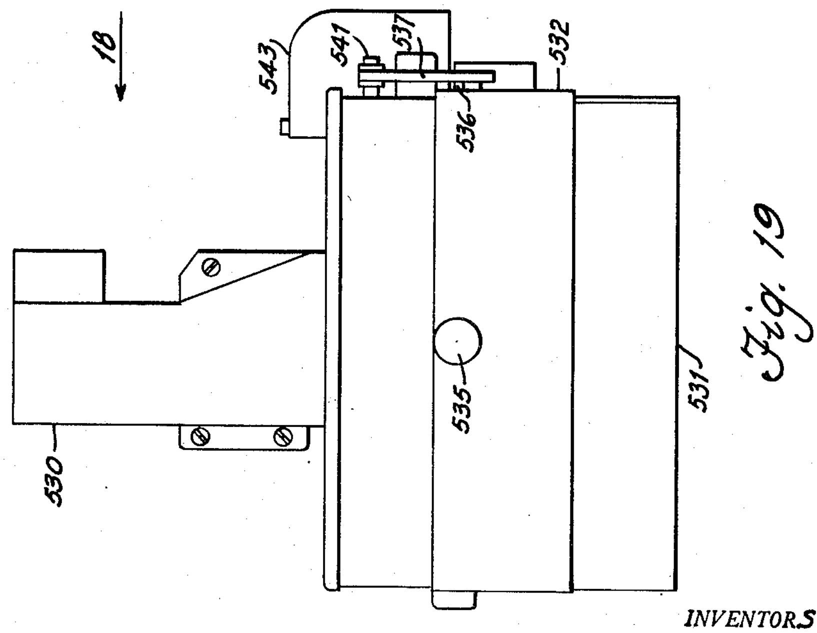

Fig. 18 is a view in the direction of arrow 18 of Fig. 19.

Figure 3:
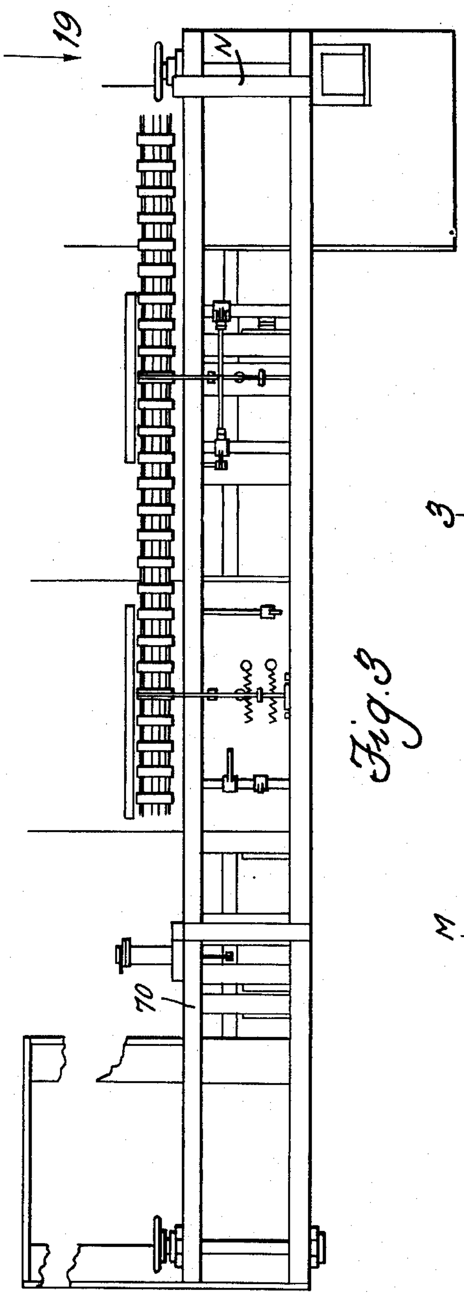
Fig. 3 is a view in the direction of arrow 3 of Fig. 2.

Fig. 19 is a view in the direction of arrow 19 of Fig. 3.

Figure 20:
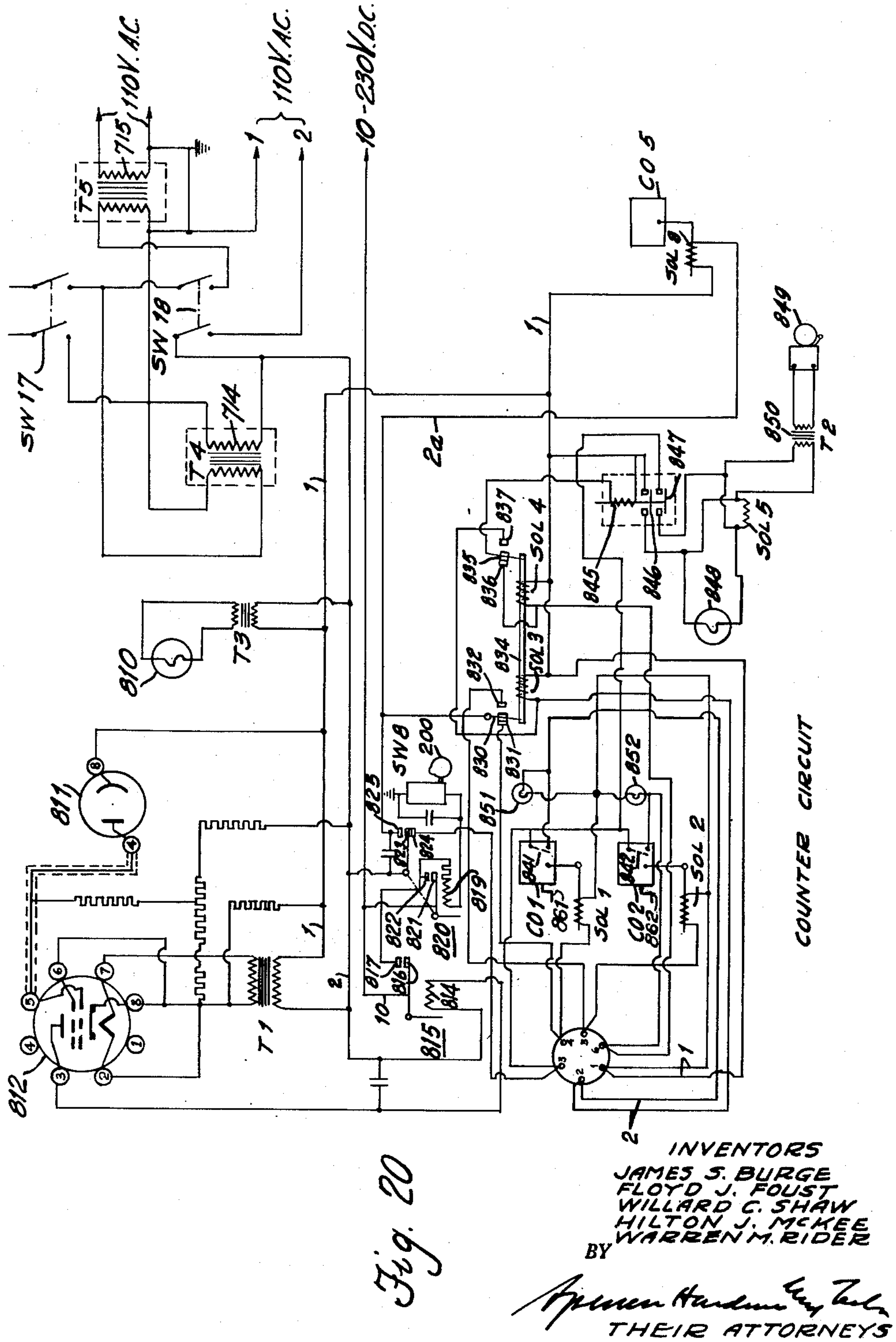

Fig. 20 is a wiring diagram of the counter control circuit.

Figure 1:
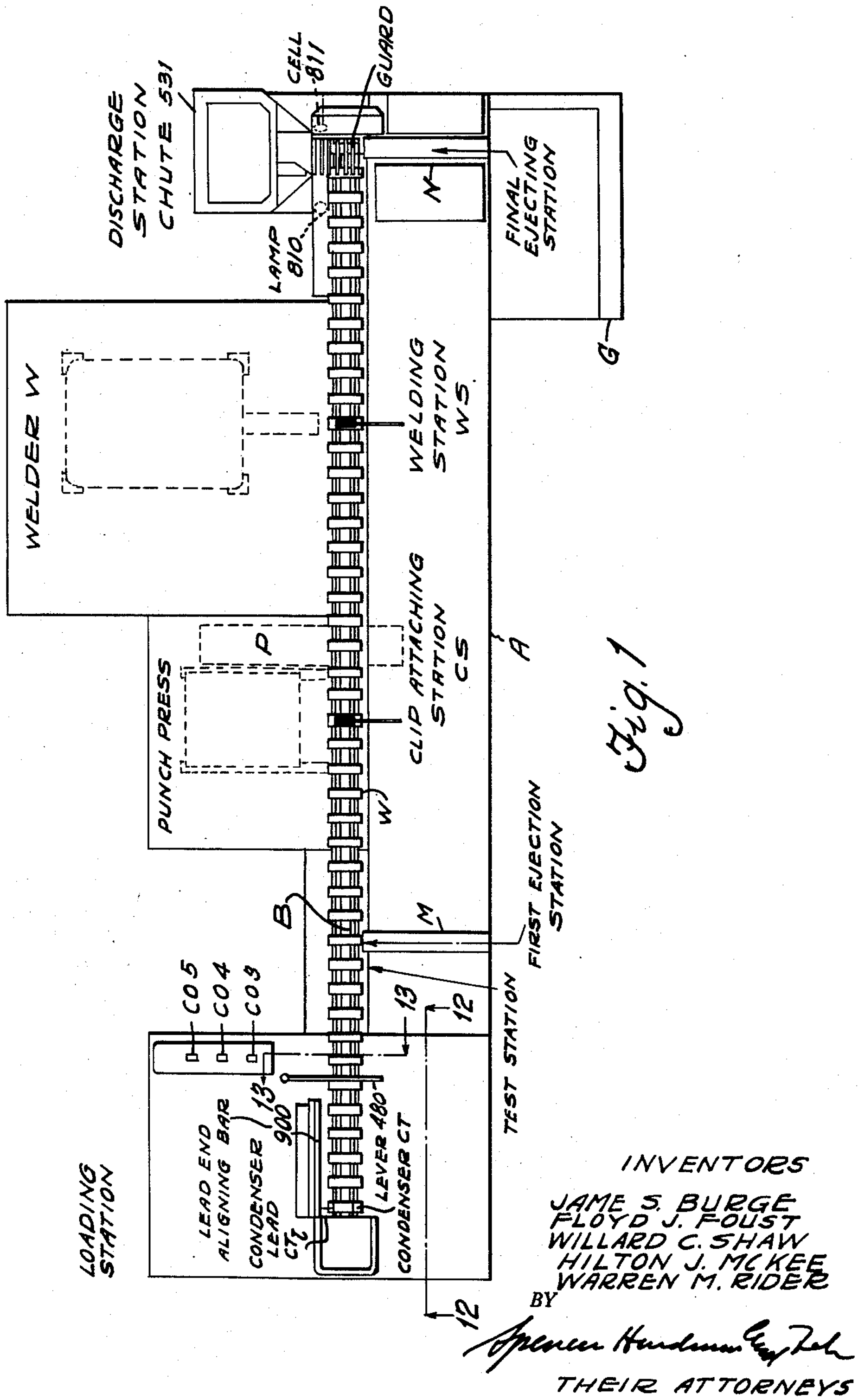
Fig. 1 is a diagrammatic plan of the machine.
Figure 2:
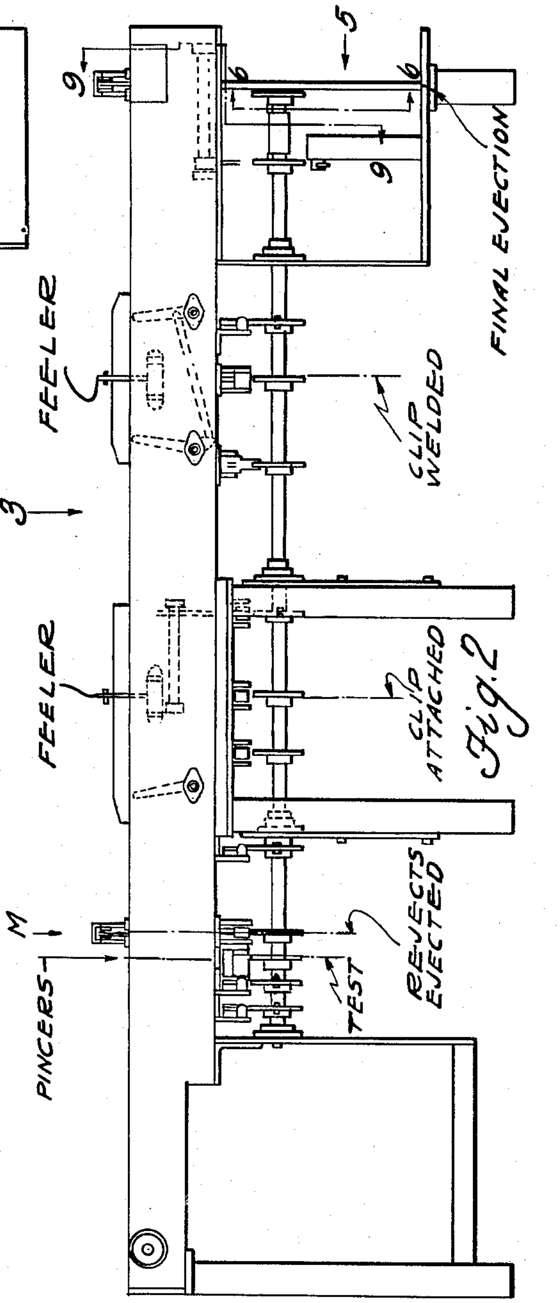
Fig. 2 is a mechanism diagram of the machine.

Referring to Fig. 1, the machine comprises a cabinet A which supports a conveyor B carrying workholders *w* each for receiving a condenser CT. As the condensers pass right in Fig. 1 on the conveyor, the terminal wire of the condenser is automatically connected with a testing apparatus to test for grounds, leaks and capacity. Those condensers which fail to pass the tests are automatically ejected by ejector M (Figs. 1 and 2). The condensers which pass the test remain on the conveyor which carries them first to a clip-attaching station CS where a terminal clip is attached to the condenser wire. The terminal clips are made by a die operated by a punch press P. Then the condensers pass to a welding station WS where the clip is welded to the terminal wire by an electric welder W. At the right end of the cabinet the condensers are ejected by ejector N.

Figure 4:
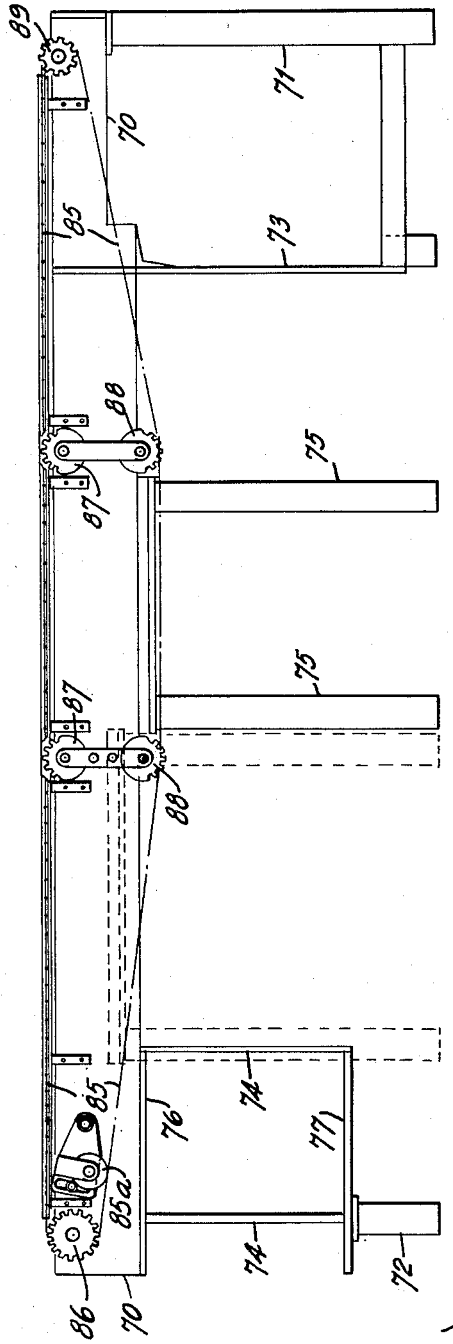
Fig. 4 is a rear elevation of the table and conveyor.
Figures 9, 10:
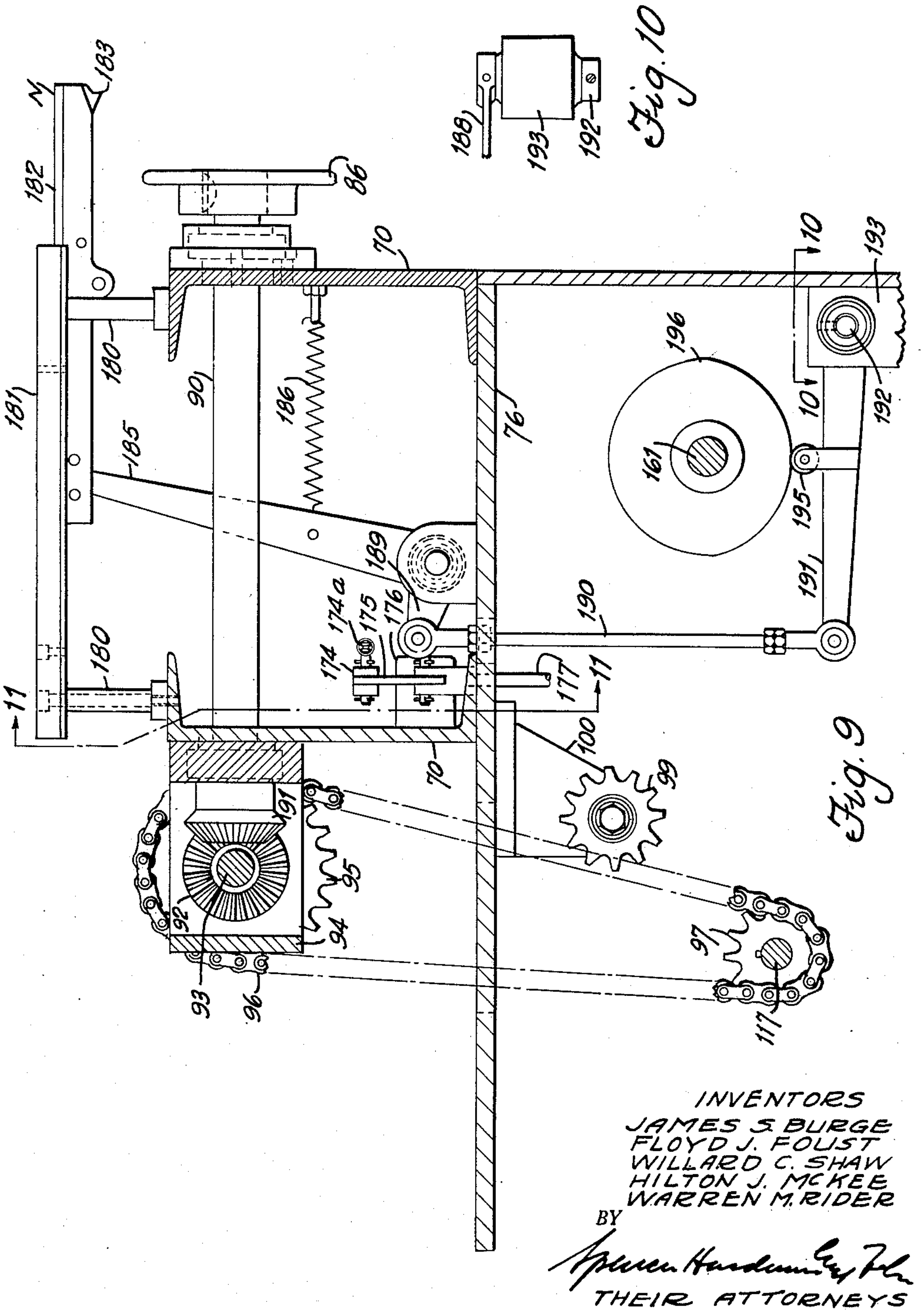
Fig. 9 is a sectional view on line 9—9 of Fig. 2.
Fig. 10 is a fragmentary view on line 10—10 of Fig. 9.

Referring to Fig. 3, the sheet metal exterior of the cabinet A (Fig. 1) is supported by a frame comprising two horizontal channel bars 70 supported above the floor by legs 71 and 72 and plates 73, 74, 76 and 77 by a table 75 which supports also the punch press P. As disclosed in detail in application S. N. 686,964, a channel 70 (Figs. 3 and 4) supports members which support the workholders *w*. The workholders *w* are attached to links of a conveyor chain 85 which as shown in Fig. 4, passes around a drive sprocket 86, a slack take-up sprocket 85*a*, upper idle sprockets 87, lower idle sprockets 88 and an end idle sprocket 89, all of these sprockets being supported by a channel bar 70. Referring to Fig. 9, sprocket 86 is supported by a shaft 90 journaled in bearings supported by the channels 70. To the shaft 90 there is attached a bevel gear 91 meshing with a bevel gear 92 connected with a shaft 93 supported by a bracket 94 attached to a bar 70. Shaft 93 is connected with a sprocket 95 connected by a chain 96 with a sprocket 97 attached to a shaft 117. Chain 96 passes around an idle sprocket 99 supported by a bracket 100 supported by plate 76.

Figure 5:
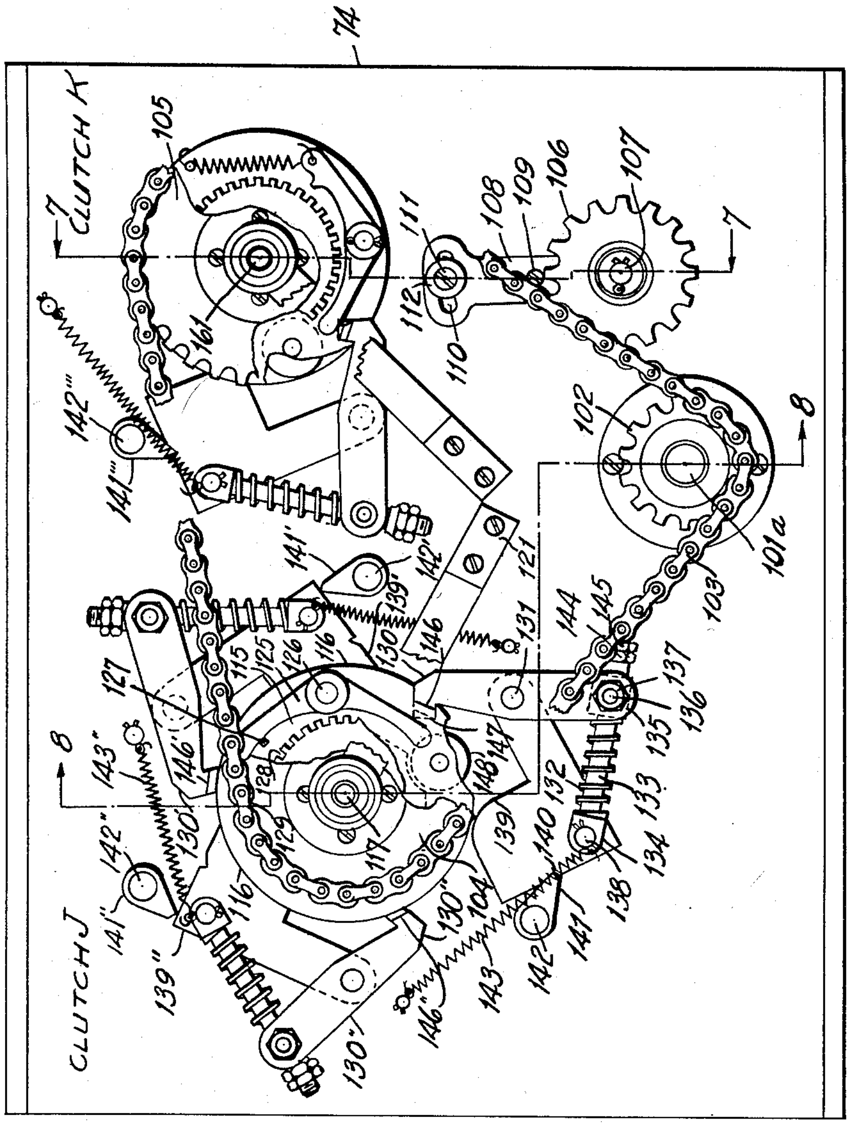
Fig. 5 is a view of a mechanism in the direction of arrow 5 of Fig. 2.

An electric motor (not shown) is operatively connected in any suitable manner with a shaft 101 (Fig. 8) connected with a shaft 101a journaled in a bearing 101b supported by plate 74 (Fig. 8) and connected with a sprocket 102 (also Fig. 5). A chain 103 passes around sprocket 102 and sprockets 104 and 105 and is engaged by an idle sprocket 106 pivotally supported at 107 by a lever 108 pivoted at 109 having a slot 110 through which passes a clamp screw 111 threaded into the plate 74. Lever 108 is adjusted to take up the slack in chain 103 and it is held in adjusted position by tightening the screw 111 which passes through a clamp washer 112.

Figure 8:
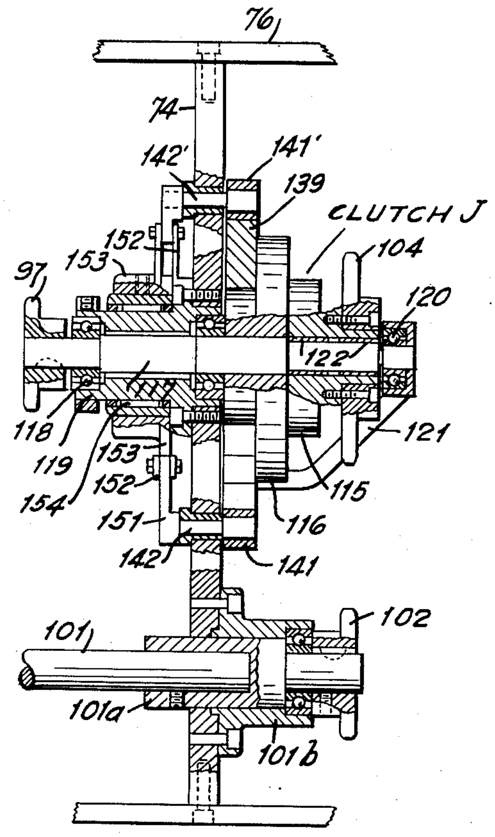
Fig. 8 is a sectional view on line 8—8 of Fig. 5.

Referring to Figs. 5 and 8, sprocket 104 is attached to the hub of a clutch driving member 115 of a one-third revolution clutch J having a driven member 116 keyed to the shaft 117, journaled in bearings 188 supported by a bushing 119 attached to plate 74. Shaft 117 carries the conveyor drive sprocket 97 (Fig. 9). Shaft 117 is journaled in a bearing 120 carried by a bracket 121 supported by plate 74. The hub of the clutch driving member 115 is fitted with bearings 122 which are journaled on the shaft 117.

Referring to Fig. 5, clutch driving member 115 is connected with clutch driven member 116 by lever 125 pivoted at 126 on member 116 and having a tooth 127 for engaging a notch 128 of the driving member 115. When the lever 125 is released for counterclockwise motion about its pivot 126, a spring 129, connecting lever 125 with member 116, causes the lever to connect the clutch members. Lever 125 is prevented from engaging its tooth 127 with a notch 128 by a lever 130 pivoted at 131 upon the plate 74 and urged counterclockwise by a spring 132 which surrounds a rod 133 and which is confined between the eye head 134 of the rod and a block 135 having a screw 136 pivoted on lever 130 and retained by a nut 137. The head 134 is pivoted at 138 on a lever 139 pivoted also on 131. Lever 139 has a notch 140 for receiving a latch pawl 141 attached to a shaft 142 which retains the lever 139 in the position shown against the action of a spring 143 connecting said lever with the plate 74. The right end of rod 133 is threaded to receive a nut 144 which, as shown in Fig. 5, is spaced slightly from the right side of the block 135. Nut 144 is locked in adjusted position by a lock nut 145. Lever 130 has a hook 146 for engaging a notch 147 in member 116. Member 116 supports a pivoted roller 148. To trip the clutch, the latch 141 is retracted by clockwise rotation of shaft 142 and the spring 143 pulls the lever 139 clockwise. Rod 133 moves left carrying with it the nut 144 which pulls on the block 135 and causes the lever 130 to move clockwise to pull the hook 146 out of the notch 147 and thereby allowing the lever 125 to move counterclockwise by the action of spring 129. The clutch members 115 and 116 are then connected and 116 will rotate counterclockwise. If there were but one set of parts number 130 through 146, the member 116 would turn one revolution. Toward the end of this movement the roller 148 engages the lever 139 to move it counterclockwise against the action of spring 143 and to cause, through the action of the spring 132, the lever 130 to be forced counterclockwise against the periphery of member 116. Before the end of the one-revolution the pawl 141 is permitted to return by spring to be described to a latching position wherein the lever 139 will be latched as shown in Fig. 5, after the roller 148 passes to the right of it. Therefore, at the end of one revolution, the lever hook 146 will snap into the notch 147 to retain the plate 116 coincidentally with the retraction of the lever tooth 127 from a notch 128 of driving member 115. In order to obtain a partial revolution of the clutch before it is automatically thrown out, for example, one-third revolution, three sets of members, numbered 130 through 146, are provided and the parts of these sets are similar to those described marked with the same reference numerals. The numerals applying to one set have a prime affixed and the numerals applying to the other set have a double prime affixed. It will be seen that the locking levers 130, 130′ and 130″ are spaced equi-angularly about the driving member 115. If lever 139 is the first to be tripped, the clutch will rotate counterclockwise one-third revolution and roller 148 will pass under lever 139′ to lift it so that it can be retained by lever 139′ and will be caught by the latch 141′ and the clutch member 116 will be stopped by the engagement with its notch 147 by the hook 146′ of lever 130′. For the next one-third revolution, the latch 141′ is retracted so as to allow the clutch members to be connected for another one-third revolution during which the roller 148 will engage the lever 139″ which will result in the engagement by the member 116 with the hook 146″ of lever 130″.

Figure 6:
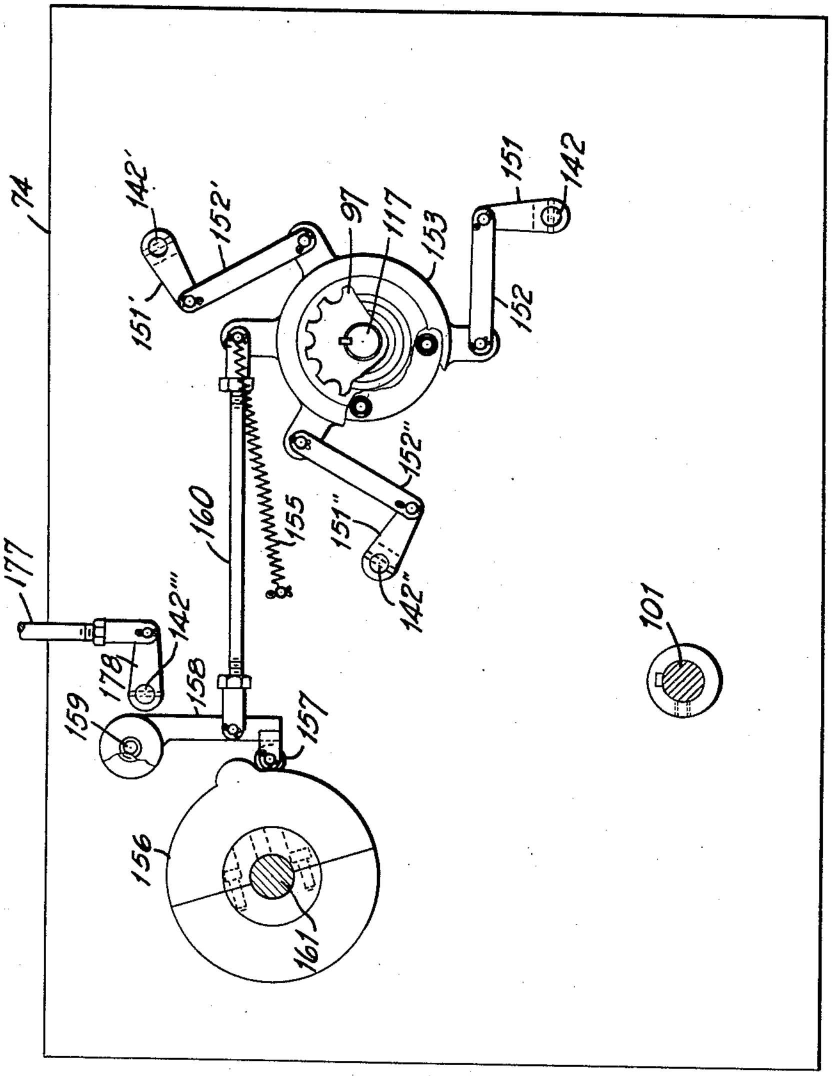
Fig. 6 is a sectional view on line 6—6 of Fig. 2.
Figure 7:
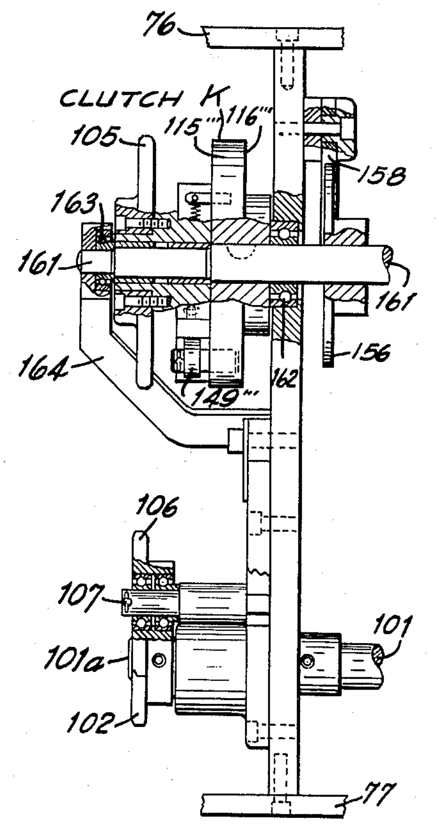
Fig. 7 is a sectional view on line 7—7 of Fig. 5.

The three latches 141, 141′ and 141″ are connected by shafts 142, 142′ and 142″, respectively, which, as shown in Fig. 6, are attached to levers 151, 151′ and 151″ connected by links 152, 152′ and 152″ with a plate 153 which, as shown in Fig. 8 is journaled on roller bearings 154 supported by the bushing 119. Plate 153 is urged by a spring 155 counterclockwise so that the shafts 142, 142′ and 142″ are urged clockwise in Fig. 6 or counterclockwise in Fig. 5 so as to urge the latching pawls into latching position. Plate 153 is rocked clockwise by a cam 156 engageable with a roller 157 carried by a lever 158 pivoted at 159 and connected with plate 153 by a link 160. Cam 156 is driven by a cam shaft 161 which, as shown in Fig. 7, is journaled in a bearing 162 supported by plate 74 and a bearing 163 supported by a bracket 164 attached to plate 74. Sprocket 105 which is journaled loosely on the shaft 161, is connected therewith through a one-revolution clutch K of the same construction as the clutch J except that there is only one set of parts like those numbered 130 through 146. The parts of clutch K which are like those of clutch J are indicated by the same numerals but with a triple prime affixed. The latch pawl 141‴ attached to shaft 142‴ is controlled by a pedal 165 (Fig. 12) pivoted at 166 connected by a link 167 with a lever 168 pivoted at 169 connected by a link 170 with a lever 171 attached to a shaft 172 connected with a lever 173 connected by a link 174 (Fig. 11) with a lever 175 pivoted at 176 and connected by a link 177 with a lever 178 (see also Fig. 6), connected with shaft 142‴. Therefore, by depressing the pedal 165, the clutch K will be continuously tripped and cam shaft 161 will continuously rotate. Each time shaft 161 makes one revolution, clutch J is tripped but it automatically throws out at the end of one-third revolution so that the conveyor will be driven intermittently while the cam shaft rotates continuously until pedal 165 is released.

Figs. 12 and 13 show a bar 480 mounted on the upper end of a shaft 481 which is supported in a bearing 482 attached to a cover plate 483 and in a bearing 484 provided by a plate 485. The bar 480 is held in a normal position by a spring 486 attached to the cover 483 and to a lever 487 attached to the shaft 481. Spring 486 urges lever 487 against a lever 488 on shaft 172. When pedal 165 is depressed lever 488 on shaft 172 moves down (Fig. 14) and allows lever 487 on shaft 481 to move left (Fig. 14) or up (Fig. 15), by the action of spring 486 until the lever 487 strikes shoulder 488a of lever 488. This causes the pedal 165 to be held in depressed position so that the machine will operate until the operator at the left end of the machine moves the stopping lever 480 attached to shaft 481.

Figure 11:
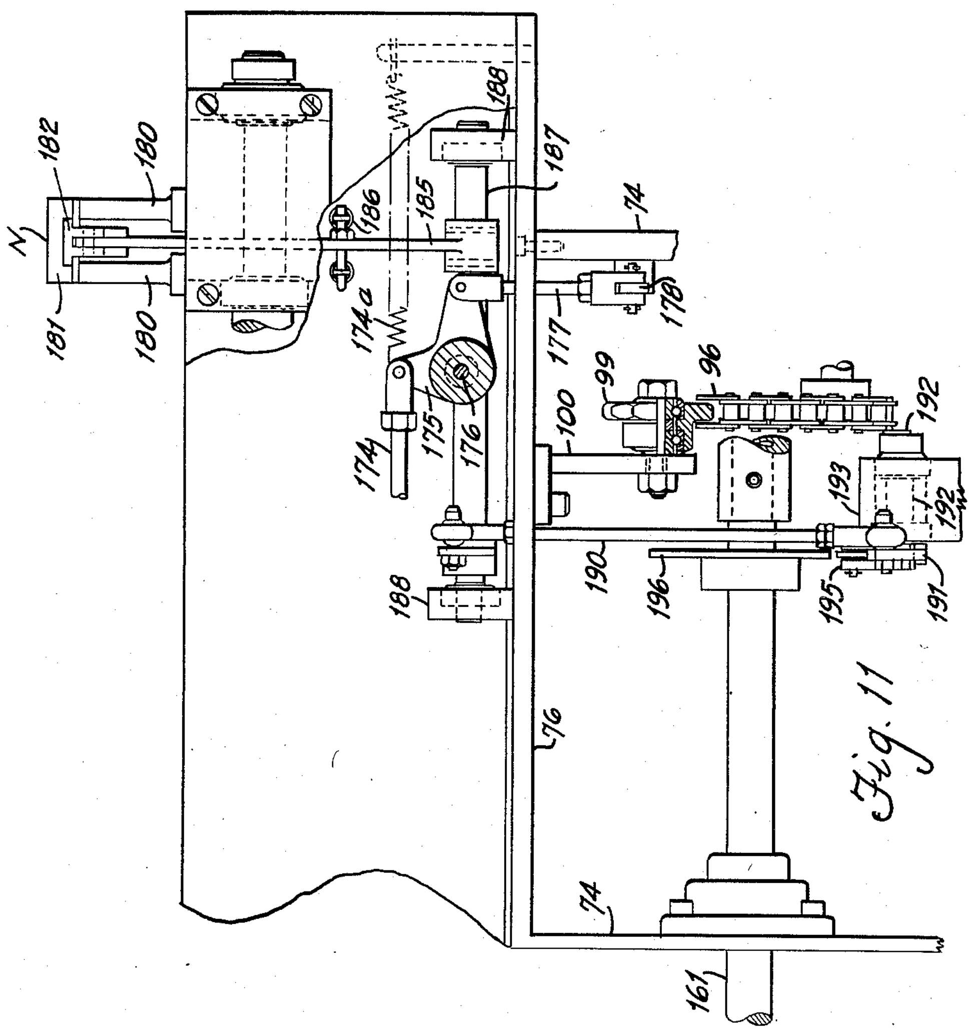
Fig. 11 is a sectional view on line 11—11 of Fig. 9.

Fig. 9, which is a sectional view on line 9—9 of Fig. 2 shows ejector N for ejecting the completed condensers from the conveyor workholder. Posts 180 supported by channels 70 support rails 181 for a slide 182 having a condenser can pusher 183. Bar 182 is operated by a lever 185 urged clockwise (Fig. 9) by spring 186 and attached to a shaft 187 journaled on brackets 188 (Fig. 11) and carrying a lever 189 connected by link 190 with a lever 191 attached to a shaft 192 journaled in a bracket 193 (Figs. 10 and 11). Lever carries a roller 195 for engaging a cam 196 driven by shaft 161.

Figs. 16 and 17 show a cabinet which encloses solenoids SOL1 and 2 having armatures 500 and 501 respectively urged up by springs not shown. Solenoid armature 501 is connected by a link 502 with a lever 504 carried by a shaft 506 rotatably supported by brackets 520 and 521. Shaft 506 is connected with an arm 508 connected by a link 510 with an arm 512 on the shaft 514 of a counter CO1. Armature 500 is connected by link 503 with a lever 505 attached to a shaft 507 journaled in brackets 520 and 521 and connected with a lever 509 connected with a lever 511 with an arm 513 connected with a shaft 515 of a counter CO2. In a manner to be described, one or the other of these solenoids is operated by "electric-eye" apparatus to cause a counter to count the good condensers as they are ejected by ejector N.

Figs. 18 and 19 show the device into which the completed condensers are discharged by the ejector N. The completed condensers are discharged into a hood 530 and descend on a chute 531 into a receptacle. Discharge of condensers from the chute 531 can be blocked by a door 532 pivotally supported at 533 by the sides of the chute. Door 532 has a handle 535 for lifting it and when it is lifted into the position shown, it is held there by virtue of engagement of a pin 536 of the door with a latch lever 537 pivoted at 540 on a side of the chute and connected by a link 541 with the armature 542 of a solenoid SOL5 located in a case 543. When the solenoid SOL5 is energized, the latch 537 will be rotated counter-clockwise to release the door so that it will drop into chute closing position. The door 432 carries an arm 545 when operating the plunger 546 of a switch SW20 which turns on a light to indicate that the door is up. Solenoid SOL5 is energized whenever a counter CO1 or CO2 has counted a certain number of condensers to be discharged into a box below the chute 531. Then the door 532 descends to block exit of condenser until an attendant can replace a full box by an empty one. When this has been done, the attendant lifts the door to permit the accumulated condensers to descend to the box and also additional condensers until the total equals the certain number for which the counter (CO1 or CO2) is set.

Fig. 20, a diagram of the counter control, shows counter CO1 operated by solenoid SOL1, counter CO2 operated by SOL2, and counter CO5 operated by solenoid SOL8. Counters CO1 and CO2 operate alternately, each counting up to 1200, for example, to fill a box, while the other is idle. Counter CO5 counts each time counter CO1 or CO2 counts and thus indicates a total of all good condensers. Each good condenser is caused to be counted when, on being ejected by ejector N, it intercepts light rays from a lamp 810 normally shining on a photo-electric cell 811 and thereby causing a thyratron tube 812 to become conducting and to pass current to the coil 814 of a relay 815 which closes its contacts 816, 817 thereby connecting line 10 (230 v. D. C.) with coil 819 of a holding relay 820 and coil 819 with ground through normally closed switch SW8. Relay 820 closes its contacts 821, 822 to by-pass contacts 816, 817 of relay 815 and coil 819 of relay 820 remains connected between line 10 and ground until switch SW8 is opened by cam 200 which operates to restore the circuit to normal status after each count.

When relay 820 is energized, its contact 823 leaves 824 and engages 825 which then connects line 2 with contact 830 then engaging 831 which is connected with solenoid SOL1 connected with line 1. Counter CO1 adds one. Counter CO5 also adds one since its operating solenoid SOL8, connected with line 1, is connected by line 2a and contacts 823, 825 of relay 820 with line 2. At the end of each operating cycle, cam 200 operated by cam shaft 161 (Fig. 20) opens switch SW8 and the relay 820 is deenergized and the solenoids SOL1 and SOL8 are deenergized. Counter CO1 continues to add one each time a condenser is ejected by ejector N until CO1 has counted up a certain number, 1200 for example. Then its switch 841 automatically closes and line 2 is connected by contacts 823, 824 of relay 820, switch 841 with solenoid SOL3 connected with line 1. SOL3 pulls armature 834 right to cause contact 830 to leave contact 831 and to engage contact 832, and contact 835 to leave contact 836 and to engage contact 837 to reverse the contacts so that counter CO1 will cease counting and counter CO2 will begin to count. Counter CO5 continues to count while counter CO2 counts. SOL3 and SOL4 act oppositely on armature 834, energizing of SOL3 causing armature 834 to move to the right and energizing SOL4, causing armature 834 to move to the left. The armature 834 remains in its right or left position until actuated oppositely by SOL3 or SOL4. Each time either of these solenoids is energized signal lights 851 and 852 burn respectively, whereupon an operator resets the particular counter involved and simultaneously deenergizes the particular solenoid through manual operation of levers 861 or 862 as explained hereinafter.

The closing of switch 841 causes lamp 851 to burn to indicate that CO1 has counted to 1200. The shifting of contact 835 to 837 causes line 2 to be connected with solenoid 845 which then closes its contacts 846, 747 to cause a lamp 848 (at the loading station) to light and solenoid SOL5 to be energized so that the door 532 (Fig. 18) drops to block descent of condensers into the already filled box. Lamp 848 informs the loading attendant to stop the machine if the box-changing attendants do not replace boxes within a reasonable time. The chute can retain 200 condensers, for example, before the full box must be replaced by an empty one. Also transformer 850 is energized to cause a bell 849 (near ejector N) to ring to tell the box-loading attendant that a box is filled and should be replaced by an empty box. He then resets counter CO1 by turning a counter-reversing crank 861 and switch 841 opens and solenoids SOL3 and 845 and SOL5 are deenergized and then lifts the door 532 so that the condensers counted by CO2 can descend into the empty box. The latch 537 holds the door up, and a lamp at the loading station energized by closing switch SW2O (Fig. 18) burns to indicate that the attendant at the ejector N has discharged his duties.

When counter CO2 counts to 1200 for example, its switch 842 closes to cause solenoid SOL4 to be energized so that armature 834 moves left to reverse the connections so that counter CO1 (previously reset) will start counting. Lamp 852 burns to indicate that CO2 has stopped counting and solenoids 845 and SOL5 are energized. The door 532 drops and lamp 848 burns and bell 849 rings as before. Counter CO2 is reset to zero by turning its resetting crank 862 and switch 842 opens and solenoids SOL4, 845 and SOL5 are deenergized. Lamp 848 stops burning, bell 849 stops ringing. The attendant replaces the full box with an empty one and lifts the door 532 as before and a lamp burns at the loading station to indicate that the attendant has discharged his duty as before.

While the embodiment of the present invention as herein disclosed, constitutes a preferred form, it is to be understood that other forms might be adopted, all coming within the scope of the claims which follow.

What is claimed is as follows:

1. In apparatus for controlling the discharge of a predetermined number of parts into a container from a machine which performs operations upon the parts, the combination comprising a continuously operating ejector, a normally open chute upon which an ejected part gravitates from the ejector to a container located adjacent the lower end of the chute, movement of a part down the chute to the container being normally completed before a succeeding part arrives at the lower end of the chute, a movable, normally closed door at the lower end of the chute to block descent of a part into the container, said door being movable to non-blocking position, a latch for retaining the door in non-blocking position, means for sensing the ejection of a part, a first counting means under control of the sensing means, means controlled by said first counting means when the latter has counted to a certain number of parts passing down said chute into said container for retracting the latch to permit the door to move into blocking position and for causing a second counting means to begin counting the ejected parts, a third counting means operating continuously for counting the total number of parts performed upon and means for manually moving said door to non-blocking position.

2. In apparatus for controlling the discharge of a predetermined number of parts into a container from a machine which performs operations upon the parts, the combination comprising a continuously operating ejector, a normally open chute upon which an ejected part gravitates from the ejector to a container located adjacent the lower end of the chute, movement of a part down the chute to the container being normally completed before a succeeding part arrives at the lower end of the chute, a door supported for gravitation to the lower end of the chute to block descent of a part into the container, said door being manually lifted to non-blocking position, a latch for retaining the door in non-blocking position, means for sensing the ejection of a part to the chute, counting means comprising two counters each of which is capable of control by the sensing means, counter selecting means for placing one counter under control by the sensing means and for interrupting control of the other counter by the sensing means and vice versa, a device actuated by each counter when it counts out, meaning to a predetermined number, means under control by the device of the counter which has counted out for causing the counter selecting means to interrupt control by the sensing means of the counter which has counted out and to place the other counter under control by the sensing means, means under control by the device of the counter which has counted out for retracting the latch to permit the door to gravitate into blocking position to prevent descent of parts into a container which has received a predetermined number of parts, the parts accumulating upon the chute inside the door being counted by the other counter while the machine attendant substitutes an empty container for the container of parts previously counted by the other counter, and means manually operated after substituting an empty container for resetting the counter which has counted out and thereby rendering its device ineffective to maintain operation of the latch retractor whereby the door, when lifted, will be retained by the latch.

3. In apparatus for controlling the discharge of a predetermined counter number of parts into a container from a machine which performs operations upon the parts, the combination comprising a continuously operating ejector, a normally open chute upon which an ejected part gravitates from the ejector to a container located adjacent the lower end of the chute, movement of a part down the chute to the container being normally completed before a succeeding part arrives at the lower end of the chute, a door supported for gravitation to the lower end of the chute to block descent of a part into the container, said door being manually lifted to non-blocking position, a latch for retaining the door in non-blocking position, a solenoid for retracting the latch to permit the door to gravitate into blocking position, a relay having a coil and normally closed contacts and normally opened contacts, a current source, means for sensing the ejection of a part to the chute, means under control by the sensing means for completing a circuit between the source and the relay coil, whereby the normally closed contacts are opened and the normally open contacts are closed, a circuit breaker opened after each rejection operation to disconnect the coil from the source whereby said relay contacts return to normal status, counting means comprising first and second counters each having a switch which is opened by manually resetting the counter and which remains open until the counter reaches said predetermined count, means for controlling the energization of the latch retracting solenoid and rendered effective by closure of either counter switch, first and second counter operating solenoids which cause counting when they are energized, means for selecting either the first or the second counter operating solenoid by partly completing a circuit between the current source and the selected solenoid, said circuit being completed by closure of the normally open contacts of the relay, means for operating the counter solenoid selecting means and including first and second selecting solenoids which, when energized, respectively condition the selecting means for selection of the first and second counter solenoids, a circuit established between the current source and the first selecting solenoid and including the closed switch of the second counter, when counted out, and the normally closed contacts of the relay, and a circuit established between the current source and the second selecting solenoid and including the closed switch of the first counter, when counted out, and the normally closed contacts of the relay.

4. In apparatus for controlling the discharge of a predetermined number of parts into a container from a machine which performs operations upon the parts, the combination comprising a continuously operating ejector, a normally open chute upon which an ejected part gravitates from the ejector to a container located adjacent the lower end of the chute, movement of a part down the chute to the container being normally completed before a succeeding part arrives at the lower end of the chute, a door support for gravitation to the lower end of the chute to block descent of a part into the container, said door being manually lifted to non-blocking position, a latch for retaining the door in a non-blocking position, means for sensing the ejection of a part to the chute, a first relay having normally open contacts and controlled by the sensing means for momentarily closing said contacts, a current source, a second relay having a coil, a circuit for connecting the second relay coil with the source and including the contacts of the first relay and a normally closed switch periodically opened once for each ejector operation, a switch closed by energization of the second relay coil for by-passing the contacts of the first relay, a second switch of the second relay closed by energization of the second relay coil and opened when said coil is deenergized, a third switch of the second relay opened by energization of the second relay coil and closed when said coil is deenergized, counting means comprising two counters, first and second, each having a switch which is opened by manually resetting the counter and which remains open until the counter counts out, first and second solenoids respectively for operating the first and second counters, counter solenoid selecting means having first set of contacts which are closed when the selecting means is conditioned for selecting the first counter solenoid and having a second set of contacts which are closed when the selecting means is conditioned for selecting the second counter solenoid, first and second selector operating solenoids respectively for conditioning the selecting means for first and second counter solenoid selection, a circuit established between the current source and the first selector operating solenoid by closure of the switch of the second counter and by the third switch of the second relay whereby the first set of contacts of the selecting means are closed, a circuit for connecting the first counter solenoid with the current source and including the first set of contacts of the selecting means and the second contacts of the second relay when closed, a circuit established between the current source and the second selector operating solenoid by closure of the switch of the first counter and by the third switch of the second relay whereby the second set of contacts of the selecting means are closed, a circuit for connecting the second counter solenoid with the current source and including the second set of contacts of the selecting means and the second contacts of the second relay when closed, a third relay switch having a coil and normally open contacts, a circuit for connecting the third relay coil with the current source and including the second set of contacts of the selecting means, the switch of the second counter when counted out and the third contacts of the second relay, another circuit for connecting the third relay coil with the current source and including the second set of contacts of the selecting means, the switch of the first counter when counted out and the third contacts of the second relay, a solenoid for effecting, when energized retraction of the latch whereby the door gravitates into blocking position to give the machine attendant opportunity to substitute an empty container for the container of a predetermined number of parts, and means for connecting the latch retracting solenoid with the current source and including contacts of the third relay and the third switch of the second relay.

5. In an apparatus for controlling the discharge of predetermined numbers of parts from a machine which performs operations thereon, the combination comprising; an ejector normally associated with the machine for intermittently ejecting parts therefrom, a normally open inclined chute upon which said ejected parts fall and gravitate therealong away from said machine, movable normally closed blocking means in said chute capable of preventing gravitational descent of said parts therealong, a latch associated with said blocking means for retaining same in non-blocking position, sensing means for sensing ejection of parts onto said chute, three counting means under control of the sensing means, the first and second counting means acting alternately to count up to a predetermined number of parts, the third counting means being superimposed upon both said first and second counting means and counting continuously the total number of parts ejected, said first and second counting means each being operative to unlatch said latch when said counting means reaches a predetermined number for permitting said blocking means to block the chute and means for reinstating the blocking means in latched condition.

References Cited in the file of this patent

UNITED STATES PATENTS

| Number | Name | Date |
|---|---|---|
| 1,435,353 | Wanders | Nov. 14, 1922 |
| 2,059,398 | Roemer | Nov. 3, 1936 |
| 2,122,710 | Bidwell et al. | July 5, 1938 |
| 2,144,708 | Rau | Jan. 24, 1939 |
| 2,256,327 | Parkes et al. | Sept. 16, 1941 |
| 2,400,489 | Dana et al. | May 21, 1946 |
| 2,470,926 | Gieseke | May 24, 1949 |
| 2,497,149 | Berdis et al. | Feb. 14, 1950 |